US010260917B2

(12) United States Patent
Otani et al.

(10) Patent No.: US 10,260,917 B2
(45) Date of Patent: Apr. 16, 2019

(54) STRUCTURE OF SCALE GRADUATION AND VEHICLE INSTRUMENT

(71) Applicant: Yazaki Corporation, Tokyo (JP)

(72) Inventors: Akihiro Otani, Shizuoka (JP); Kouhei Takeshita, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 439 days.

(21) Appl. No.: 15/040,232

(22) Filed: Feb. 10, 2016

(65) Prior Publication Data
US 2016/0161303 A1 Jun. 9, 2016

Related U.S. Application Data

(63) Continuation of application No. PCT/JP2014/074491, filed on Sep. 17, 2014.

(30) Foreign Application Priority Data

Sep. 17, 2013 (JP) .................. 2013-192167

(51) Int. Cl.
B60K 35/00 (2006.01)
B60K 37/02 (2006.01)
(Continued)

(52) U.S. Cl.
CPC ............ *G01D 13/20* (2013.01); *B60K 35/00* (2013.01); *B60K 37/02* (2013.01); *G01D 11/28* (2013.01);
(Continued)

(58) Field of Classification Search
CPC ........ G01D 13/20; G01D 13/28; G01D 13/04; G01D 11/28; B60K 35/00; B60K 37/02; B60K 2350/203
(Continued)

(56) References Cited

U.S. PATENT DOCUMENTS 2,328,485 A * 8/1943 Ott .......................... G01D 13/28
116/288
3,724,202 A * 4/1973 Feller ..................... G04B 19/06
368/232
(Continued)

FOREIGN PATENT DOCUMENTS

| JP | 11-105581 A | 4/1999 |
| JP | 2001-511894 A | 8/2001 |

(Continued)

OTHER PUBLICATIONS

International Search Report for PCT/JP2014/074491 dated Dec. 9, 2014.

Primary Examiner — Lisa M Caputo
Assistant Examiner — Tania Courson
(74) Attorney, Agent, or Firm — Sughrue Mion, PLLC

(57) ABSTRACT

A structure of a scale graduation includes: a meter dial plate, a light-guiding body made of a translucent material in a dark color, a three-dimensional graduation disposed in a protruding manner on a front surface of the light-guiding body and made of a translucent material in the dark color disposed on the front side of the meter dial plate, and a light source that makes light enter the three-dimensional graduation through the light-guiding body. When the light source emits outgoing light, the three-dimensional graduation lights on in a light color different from the dark color.

14 Claims, 5 Drawing Sheets

(51) Int. Cl.
*G01D 11/28* (2006.01)
*G01D 13/04* (2006.01)
*G01D 13/20* (2006.01)
*G01D 13/28* (2006.01)

(52) U.S. Cl.
CPC ............ *G01D 13/04* (2013.01); *G01D 13/28* (2013.01); *B60K 2350/203* (2013.01)

(58) Field of Classification Search
USPC ........ 116/49, 62.1, 284, 286, 287, 288, 298, 116/302, 305; 362/23, 26; 340/815.53, 340/815.73, 870.02, 870.03
See application file for complete search history.

(56) References Cited

U.S. PATENT DOCUMENTS

| | | | | |
|---|---|---|---|---|
| 3,890,716 A * | 6/1975 | Hatch | ................... | G01D 13/10 116/298 |
| 4,044,708 A * | 8/1977 | Klein | ................... | G01D 11/28 116/286 |
| 4,875,433 A * | 10/1989 | Tsukamoto | ............ | G01D 11/28 116/334 |
| 5,245,944 A * | 9/1993 | Yamamoto | ............ | G01D 13/10 116/284 |
| 5,513,153 A * | 4/1996 | Thorgersen | .......... | G04B 19/065 29/896.32 |
| 6,573,877 B2 * | 6/2003 | Wedel | ................... | G01D 11/28 345/4 |
| 6,663,252 B1 * | 12/2003 | Fong | ..................... | B60K 37/02 116/48 |
| 6,802,276 B2 * | 10/2004 | Sugimoto | .............. | B60K 37/02 116/286 |
| 6,904,866 B2 * | 6/2005 | Furuya | .................. | G01D 11/28 116/286 |
| 7,374,323 B1 * | 5/2008 | Kelman | ................. | G01D 11/28 116/286 |
| 7,798,091 B2 * | 9/2010 | Suita | ..................... | B60K 37/02 116/287 |
| 8,814,375 B2 * | 8/2014 | Makita | .................. | G01D 13/28 362/23.01 |
| 8,826,846 B2 * | 9/2014 | Hori | ...................... | G01D 11/28 116/286 |
| 9,121,737 B2 * | 9/2015 | Kitagawa | ............... | G01D 11/28 |
| 9,316,511 B2 * | 4/2016 | Mochizuki | ............ | G01D 13/04 |
| 9,664,541 B2 * | 5/2017 | Otani | .................... | G01D 11/28 |
| 9,739,648 B2 * | 8/2017 | Takeda | .................. | G01D 13/02 |
| 9,829,371 B2 * | 11/2017 | Otani | .................... | G01G 23/32 |
| 2002/0089468 A1 | 7/2002 | Wedel et al. | | |
| 2009/0103278 A1 * | 4/2009 | Miyashita | .............. | B60K 37/02 362/23.18 |
| 2015/0096487 A1 * | 4/2015 | Mochizuki | ............ | G01D 13/18 116/286 |
| 2016/0091346 A1 * | 3/2016 | Otani | .................... | G01D 11/28 362/23.16 |

FOREIGN PATENT DOCUMENTS

| | | |
|---|---|---|
| JP | 2006-275677 A | 10/2006 |
| JP | 2008-286575 A | 11/2008 |
| JP | 2009-128088 A | 6/2009 |
| JP | 2012-047577 A | 3/2012 |
| WO | 98/36420 A1 | 8/1998 |

\* cited by examiner

STRUCTURE OF SCALE GRADUATION AND VEHICLE INSTRUMENT

CROSS-REFERENCE TO RELATED APPLICATION

This application is a continuation application of International Application PCT/JP2014/074491, filed on Sep. 17, 2014, and designating the U.S., the entire contents of which are incorporated herein by reference.

BACKGROUND OF THE INVENTION

1. Field of the Invention

The present invention relates to a structure of a scale graduation and a vehicle instrument.

2. Description of the Related Art

Among vehicle instruments used for automobiles, some instruments with a graduation ring have been known that achieve improved appearance and visibility of three-dimensional graduations with a simple structure (refer to Japanese Patent Application Laid-open No. 2006-275677, for example). Such an instrument with a graduation ring illustrated in FIG. 5 is assumed an analog engine tachometer used for an automobile. The instrument with a graduation ring includes a graduation ring member 501, a dial plate (a meter dial plate) 503, a red line sheet 505, a light-guiding plate 507, and a substrate 511 including a light source 509. On the graduation ring member 501 having light-guiding property, three-dimensional graduations 513 are disposed in a protruding manner. Between the back surface of the three-dimensional graduations 513 and the light source 509, the red line sheet 505 is disposed in a similar color to the red ink (not illustrated) printed on the three-dimensional graduations 513. With the instrument with the graduation ring, if the print of the red ink is defective, the above-described structure can compensate for the defective print when the light source is on. Accordingly, the instrument with the graduation ring achieves improved appearance and visibility of the three-dimensional graduations 513 with a simple structure.

In recent automobiles, meters with improved appearance have been used by lighting up the light source 509 day and night when the ignition is ON to illuminate the three-dimensional graduations 513 themselves. That is, when the ignition is ON, the graduations are illuminated in a white kind of color. When the ignition is OFF, the graduations are dimmed so that the real image thereof is difficult to see. This operation enhances the effect of representation of the conventional meter by the lighting when the ignition is ON. However, a normal graduation 515 barely appears as a transparent acrylic material. With such a transparent member, the graduation may look cloudy from the view direction due to reflection from the graduation surface, for example. For this reason, when the ignition is OFF, if the graduation 515 look cloudy due to the reflection, the graduation 515 may be recognized as if it illuminates, which reduces the effect of representation of the meter. In particular, if the back surface of the graduation 515 is grained to reduce the luminance of the graduation, the cloudiness is increased. Simply reducing the transmittance of the transparent member will mitigate the cloudiness to some extent. However, it will reduce the lighting effect when the ignition is ON, which leads to insufficient effect of representation, leading to poor appearance.

SUMMARY OF THE INVENTION

In view of the circumstances described above, the present invention aims to provide a structure of a scale graduation and a vehicle instrument that achieve improved appearance of the graduation when the ignition is ON and when the ignition is OFF.

To achieve the above-described objective, a structure of a scale graduation according to one aspect of the present invention includes a meter dial plate; a light-guiding body made of a translucent material in a dark color; a three-dimensionally designed portion disposed in a protruding manner on a front surface of the light-guiding body, and made of the translucent material in the dark color disposed on the front side of the meter dial plate; and a light source that makes light enter the three-dimensionally designed portion through the light-guiding body, wherein when the light source emits outgoing light, the three-dimensionally designed portion lights on in a light color different from the dark color.

According to the present invention, a three-dimensionally designed portion on a light-guiding body made of a translucent material in a dark color looks black from the view direction due to reflected light from the graduation surface of extraneous light when a light source is OFF. When the light source is ON, the three-dimensionally designed portion looks in a light color different from the color when the light source is OFF. As a result, a clear contrast is generated between the appearance when the light source is ON and the appearance when the light source is OFF (the three-dimensionally designed portion looks a light color during ON, and a dark color during OFF), thereby achieving favorable effect of lighting representation.

According to another aspect of the present invention, in the structure of the scale graduation, it is desirable that the three-dimensionally designed portion is protruded from a through-hole provided by perforating to the meter dial plate, and is disposed on the front side of the meter dial plate.

According to still another aspect of the present invention, in the structure of the scale graduation, it is desirable that a grained surface is provided on a place in the light-guiding body where light enters from the light source, and corresponding to the three-dimensionally designed portion. According to the present invention, when the ignition is ON, the light diffused by the grained surface is emitted from the three-dimensionally designed portion. According to the present invention, therefore, unevenness of the intensity of the light emitted from the three-dimensionally designed portion is prevented. According to the present invention, owing to the presence of the grained surface, when the ignition is OFF, extraneous light entering the three-dimensionally designed portion is reflected on the grained surface as reflected light having the wavelength of a dark color. This operation prevents the three-dimensionally designed portion from looking cloudy. In particular, when a light diffusion plate in a white kind of color is disposed, the extraneous light is likely to look cloudy without the grained surface because the extraneous light is reflected by the light diffusion plate. With the structure according to the present invention, the grained surface prevents the extraneous light from entering the light diffusion plate, thereby preventing the three-dimensionally designed portion from looking cloudy.

According to still another aspect of the present invention, in the structure of the scale graduation, it is desirable that a color print in a similar color to that of the light-guiding body is provided on the front surface of the meter dial plate. According to the present invention, the color of the dial plate is similar to the color of the three-dimensionally designed portion, which generates such an effect of contrast balance that the real image of the three-dimensionally designed portion is difficult to see. This structure effectively enhances the appearance when the ignition is ON.

A vehicle instrument according to still another aspect of the present invention includes the above-described structure of the scale graduation. In the vehicle instrument, a plurality of the three-dimensionally designed portion in the structure of the scale graduation are disposed and serve as scale graduations of an instrument indicated by a pointer. The vehicle instrument includes a meter housing which houses therein the meter dial plate, the light-guiding body, the three-dimensionally designed portions, and the light source in the structure of the scale graduation, and exposes the meter dial plate and the three-dimensionally designed portion toward a vehicle room.

According to still another aspect of the present invention, it is desirable that the vehicle instrument further includes an annular portion, wherein the three-dimensionally designed portions are disposed along the outer circumferential edge of a meter dial plate, the annular portion covers the outer circumferential edge of the meter dial plate and partially covers the three-dimensionally designed portions from the vehicle room side, and the annular portion is provided as an annular facing integrally formed with the meter housing in a similar color to that of the light-guiding body, or as an annular member independently formed of the meter housing in a similar color to that of the light-guiding body.

The present invention has been briefly described. The present invention will be more clearly understood in detail by reading through the following description of an embodiment for practicing the present invention (hereinafter referred to as "embodiment") with reference to the accompanying drawings.

DETAILED DESCRIPTION OF THE PREFERRED EMBODIMENTS

An embodiment of the structure of a scale graduation and a vehicle instrument of the present invention will now be described with reference to the drawings.

Figure 1:
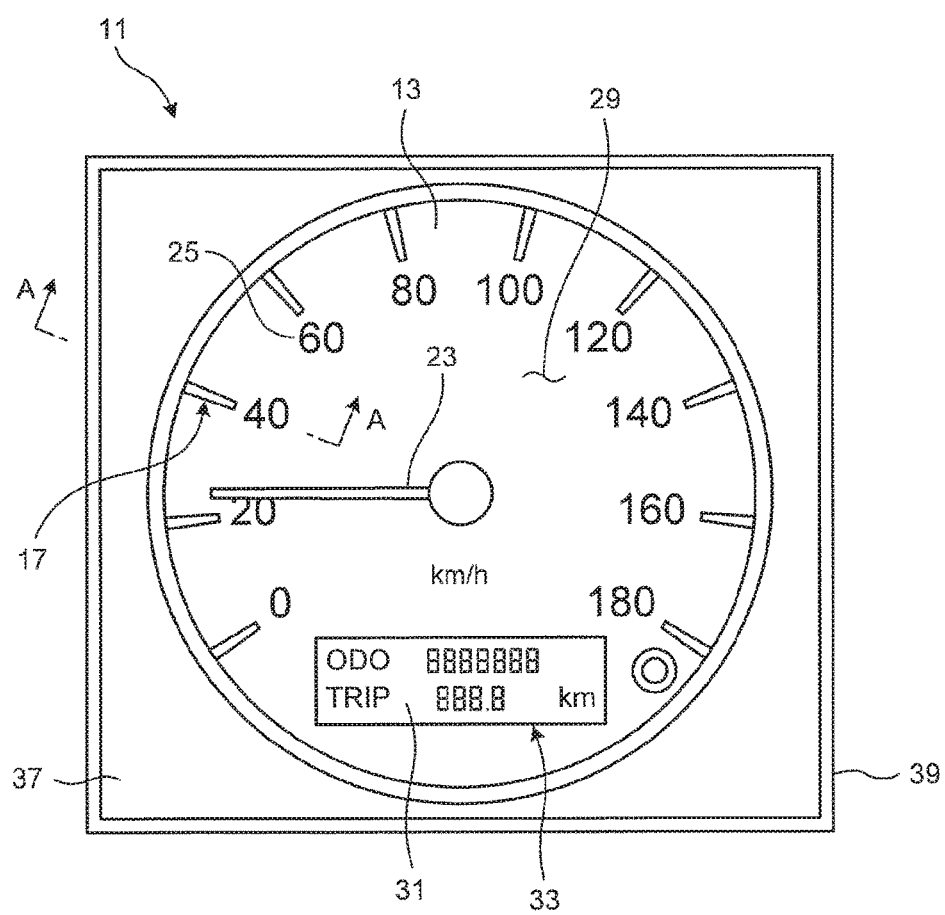
FIG. 1 is a front view of an analog speedometer for a vehicle including the structure of a scale graduation according to an embodiment of the present invention.
Figure 2:
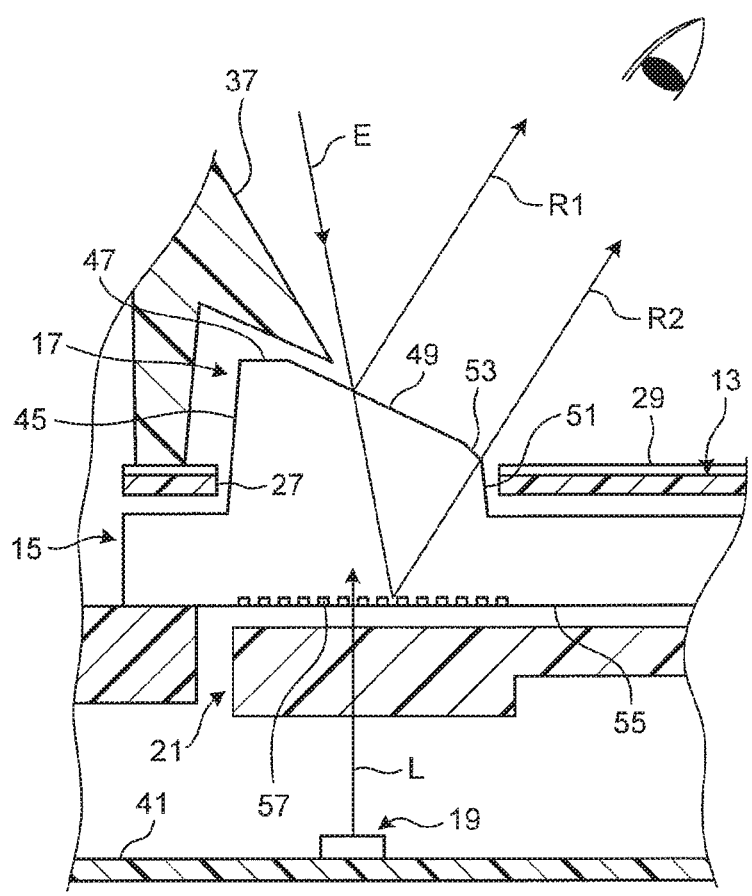
FIG. 2 is a sectional view of FIG. 1 along the line A-A.
Figure 3:
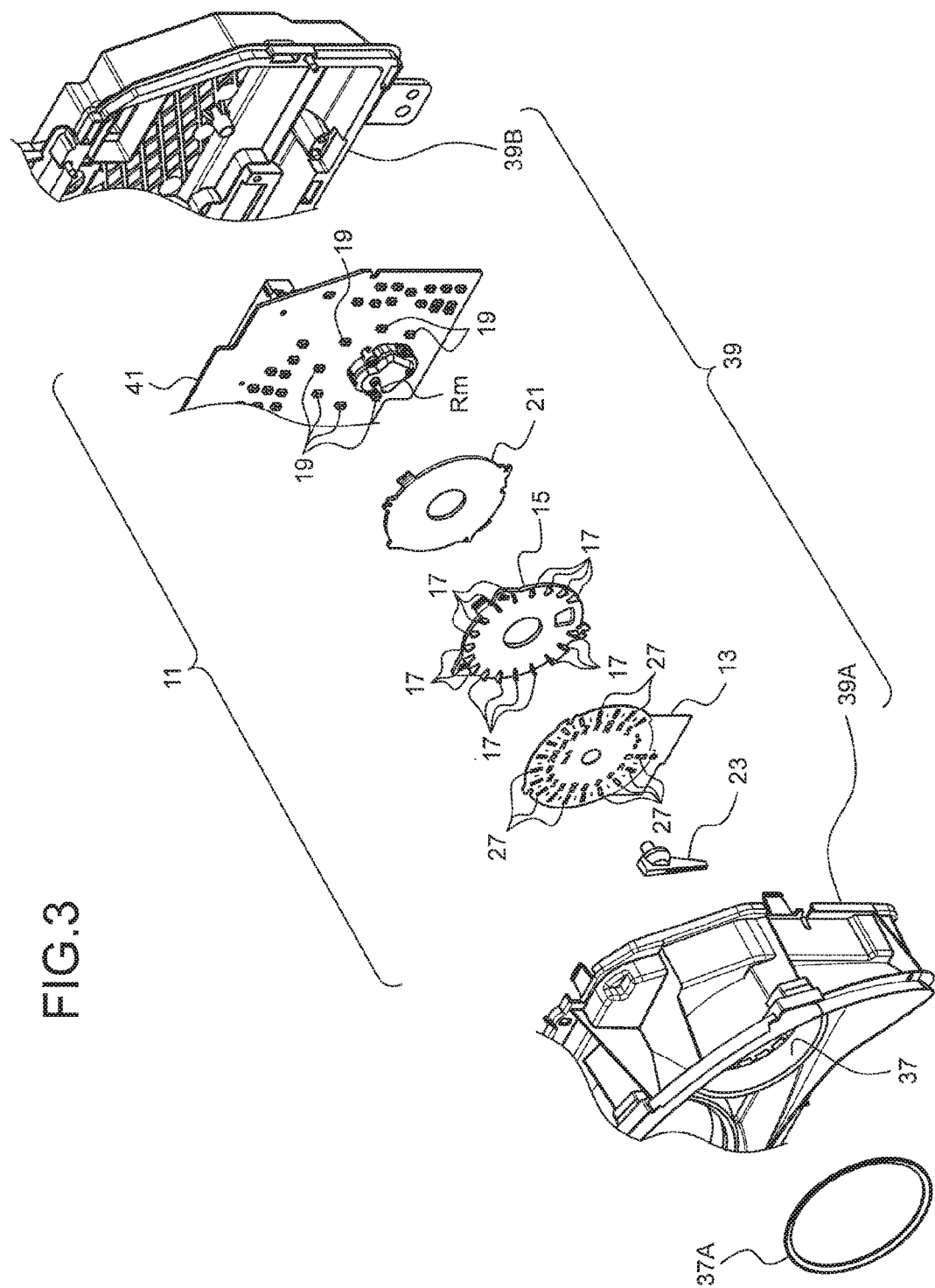
FIG. 3 is an exploded perspective view illustrating the principal part of a vehicle instrument according to the embodiment of the present invention.

As illustrated in FIGS. 1 to 3, the structure of the scale graduation according to the embodiment of the present invention is assumed, for example, an analog speedometer 11 for a vehicle. FIG. 1 is a diagram conceptually illustrating the speedometer 11 and a meter housing 39. FIG. 3 is an example diagram of the vehicle instrument including the speedometer 11 and the meter housing 39. FIG. 3 illustrates only the principal parts of the components in the vehicle instrument for convenience of illustration. The structure of the scale graduation (the speedometer 11) includes a meter dial plate 13, a light-guiding body 15, a three-dimensional graduation 17 that is a three-dimensionally designed portion, a light source 19, and a light-transmitting member 21. For example, the shape of the principal parts of the light-guiding body 15 and the light-transmitting member 21 is tailored to the shape of the meter dial plate 13. In this example, the light-guiding body 15 and the light-transmitting member 21 are each formed in a circular shape because the meter dial plate 13 is formed in a circular shape.

In the speedometer 11, a pointer 23 indicates the speed of the vehicle by rotatively moving above the meter dial plate 13. The speedometer 11 includes scale graduations represented with designed numerals 25 provided to the meter dial plate 13; and the three-dimensional graduations 17 protruded from through-holes 27 in the meter dial plate 13 as described later, as indications of the speed of the vehicle indicated by the pointer 23.

The speedometer 11 is housed in and fixed to, as illustrated in FIG. 3, the meter housing 39, thereby serving as a part of the vehicle instrument. The meter housing 39 also houses therein a not-illustrated engine tachometer, for example. The meter housing 39 includes a first housing member 39A disposed on the vehicle room side; and a second housing member 39B fixed to the first housing member 39A. The speedometer 11 is sandwiched between the first housing member 39A and the second housing member 39B, and disposed in the internal space formed by the first housing member 39A and the second housing member 39B. The first housing member 39A includes a later-described annular facing 37, the inner side of the inner circumferential surface of which in the radial direction is open. The meter dial plate 13 and the three-dimensional graduations 17 are exposed from the opening toward the vehicle room. For example, on the back side of the first housing member 39A (on the opposite side from the vehicle room side), grooves (not illustrated) are disposed that each retain the outer circumferential edges of the meter dial plate 13, the light-guiding body 15, and the light-transmitting member 21. The meter dial plate 13, the light-guiding body 15, and the light-transmitting member 21 are stacked in this order from the vehicle room side and fitted into the respective grooves of the first housing member 39A. These stacked meter dial plate 13 and the rest are covered with a substrate 41 from the back side of the first housing member 39A. On the substrate 41, the light source 19 is mounted. The substrate 41 is fixed to the back side of the first housing member 39A. The pointer 23 is mounted on a rotational axis Rm coupled to an output shaft of a motor (not illustrated) and rotatively moves above the meter dial plate 13 together with the rotational axis Rm by a given amount in accordance with the measured value of a revolution sensor (not illustrated) such as a vehicle speed sensor. The motor is provided to the substrate 41. FIG. 3 partially illustrates the first housing member 39A, the second housing member 39B, and the substrate 41 for convenience of illustration.

On the front surface of the meter dial plate 13, a later-described color print 29 is provided in a similar color to that of the light-guiding body 15. On the under surface of the pointer 23, a layer of a hot-stamping print in red, for example, is provided. This structure enables the pointer 23 to be visually recognized that it is illuminated in the color of the layer of hot-stamping print. In the lower section in the meter dial plate 13, a multi-display section 33 is disposed that includes a liquid crystal display (LCD) 31 (omitted in FIG. 3). On the outer side of the meter dial plate 13, an annular portion 37 is provided to cover the outer circumferential edge of the meter dial plate 13 from the front side. The annular portion 37 partially covers the three-dimensional graduation 17 (on the outer circumferential edge side of the meter dial plate 13) in addition to the outer circumferential edge of the meter dial plate 13 from the vehicle room side. From the opening on the inner side of the annular portion 37 in the radial direction, the portions of the meter dial plate 13 and the three-dimensional graduations 17 not covered with the annular portion 37 are exposed toward the vehicle room. That is, in the meter dial plate 13, the inner side portion in the radial direction relative to the outer circumferential edge covered with the annular portion 37 is exposed. In the three-dimensional graduations 17, the portions excluding the portions covered with the annular portion 37 (the outer portions in the radial direction viewed from the meter dial plate 13 or the light-guiding body 15) are exposed. For example, the annular portion 37 is provided as an annular facing integrally formed with the meter housing 39 (the first housing member 39A) in the dark color (i.e., a similar color to that of the light-guiding body 15). Alternatively, the annular portion 37 is provided as an annular member independently formed of the meter housing 39 (the first housing member 39A) in the dark color (i.e., a similar color to that of the light-guiding body 15). In this example, the former component, a facing 37 is provided as the annular portion 37. On the outer circumferential edge of the facing 37, an annular member (a ring member) 37A different from the latter annular member is disposed from the vehicle room side (FIG. 3). The annular member 37A is made of, for example, a synthetic resin or a metallic material such as aluminum, and fixed to the outer circumferential edge of the facing 37 by a double-faced adhesive tape (not illustrated).

On the back side of the meter dial plate 13 (on the opposite side from the vehicle room side), the above-described light-guiding body 15 is disposed. The light-guiding body 15 is made of a translucent material in a dark color. In the present embodiment, the light-guiding body 15 is made of an acrylic resin in a smoky color, including a dark color such as black or dark blue. On the front side of the light-guiding body 15 (the surface of the vehicle room side, and the light-guiding body front surface), the three-dimensional graduations 17 are disposed in a protruding manner. The three-dimensional graduations 17 are integrally formed with the light-guiding body 15. That is, the three-dimensional graduations 17 are protrusions protruded from the front side of the light-guiding body 15 toward the vehicle room and provided in a dark color similar to that of the light-guiding body 15. The plural three-dimensional graduations 17 are disposed along the outer circumferential edge of the meter dial plate 13, thereby serving as scale graduations of the instrument indicated by the pointer 23.

Each of the three-dimensional graduations 17 disposed in a protruding manner on the light-guiding body 15 is disposed on the front side of the meter dial plate 13 (on the vehicle room side). For example, the three-dimensional graduations 17 are protruded from the through-holes 27 provided to the meter dial plate 13 by perforating, and the like. In the present embodiment, each of the three-dimensional graduations 17 is formed as an upright piece having an almost trapezoidal shape. The three-dimensional graduation 17 has an outline, in an almost trapezoidal shape from the side view, including a long upright side 45 rising from the light-guiding body 15, a horizontal side 47 parallel to the light-guiding body front surface, an inclined side 49 that is inclined to the light-guiding body front surface, and a short upright side 51 rising from the light-guiding body 15 (refer to FIG. 2). The long upright side 45 and the short upright side 51 are disposed having an interval therebetween. The long upright side 45 is disposed on the outer side of the light-guiding body 15 in the radial direction relative to the short upright side 51. The horizontal side 47 is extended from the top end of the long upright side 45 to the inner side of the light-guiding body 15 in the radial direction. The inclined side 49 is an inclined side that connects the extended end of the horizontal side 47 to the top end of the short upright side 51. Between the inclined side 49 and the short upright side 51, a chamfer 53 is provided. In the three-dimensional graduation 17, the inclined side 49 is the main surface of the graduation. That is, the light transmitted from the light-guiding body 15 is emitted from the graduation surface. The shape of the three-dimensional graduation 17 is not limited to the above-described upright piece having an almost trapezoidal shape, as long as it is disposed in a protruding manner on the front side of the meter dial plate 13.

In the speedometer 11, the light source 19 is disposed that makes light enter the three-dimensional graduation 17 through the light-guiding body 15. The light source 19 in this example is disposed on the back side of the light-guiding body 15 (on the opposite side from the vehicle room side). The light source 19 is mounted on the substrate 41 supported by the meter housing 39. The light source 19 emits light to the back side of the light-guiding body 15 (a light-guiding body back surface 55). The "L" illustrated in FIG. 2 represents a portion of outgoing light of the light source 19. The light source 19 is, for example, a light-emitting diode (LED) that emits light in a light color such as white, red, blue, and green. The light source 19 operates to emit light when the ignition is ON (the light source is ON), and stops to stop emitting the light when the ignition is OFF (the light source is OFF).

Figure 4:
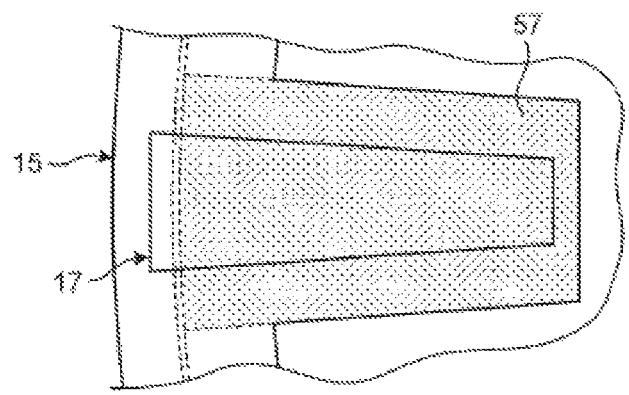
FIG. 4 is a under surface view of a light-guiding body having a grained surface provided on the opposite side from a three-dimensional graduation.
Figure 5:
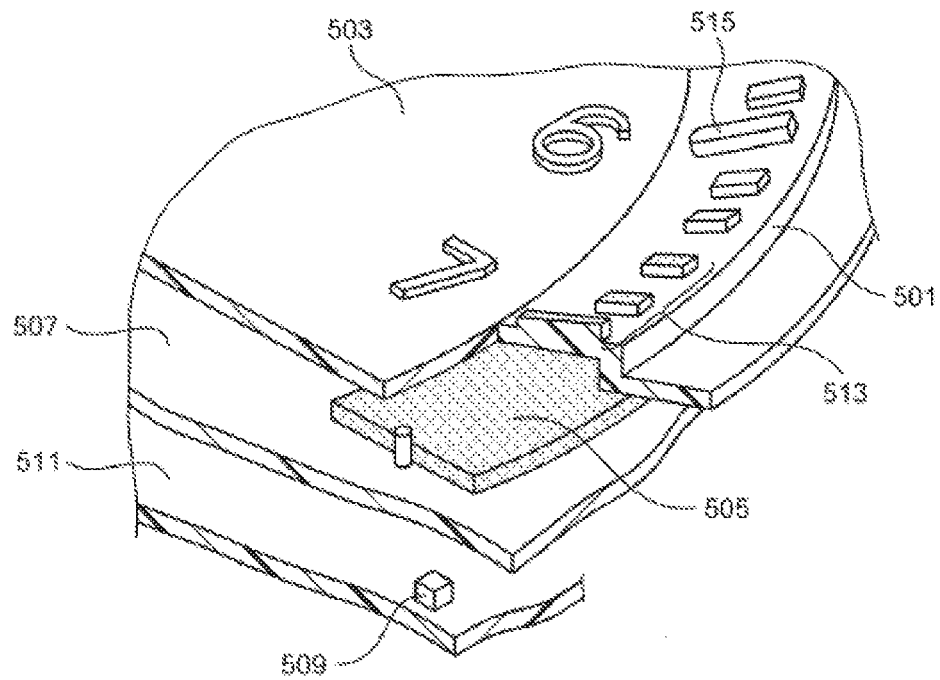
FIG. 5 is an enlarged perspective view of the principal part of a prior art graduation ring member that is partially cut.

On the place in the light-guiding body 15 where light enters from the light source 19, and corresponding to the three-dimensional graduation 17, a grained surface 57 is provided. Specifically, the grained surface 57 is provided corresponding to the three-dimensional graduation 17 on the light-guiding body back surface 55 of the light-guiding body 15. The grained surface 57 includes, as illustrated in FIG. 4, the area where the three-dimensional graduation 17 is formed. The grained surface 57 diffuses the incoming light from the light source 19 and enables the front side of the light-guiding body 15 or the three-dimensional graduation 17 to emit the diffused light therefrom. The grained surface 57 also reflects, as illustrated in FIG. 2, a portion of extraneous light E entered from the graduation surface of the three-dimensional graduation 17. The extraneous light E reflected by the grained surface 57 is emitted from the three-dimensional graduation 17 as reflected light R2 to the outside.

In the structure of the scale graduation according to the present embodiment, a smoky black color material is used, for example, for the three-dimensional graduation 17 as the translucent material in a dark color. When the three-dimensional graduation 17 is viewed from the view direction, reflected light R1 from the graduation surface or the reflected light R2 from the grained surface 57 both look black due to the smoky black color from the graduation surface to the grained surface 57. This structure enables the three-dimensional graduation 17 itself to look black viewed from the view direction.

Between the light-guiding body 15 and the light source 19, the light-transmitting member 21 is disposed. The light-transmitting member 21 is a light diffusion plate for dimming and diffusing the incoming light from the light source 19, and emitting the dimmed and diffused light to the light-guiding body 15. The light-transmitting member 21 in this example is made of a translucent material in a white kind of color.

When the ignition is ON, the light from the light source 19 enters the light-guiding body 15 through the light-transmitting member 21. As described above, the color print 29 is provided on the front surface of the meter dial plate 13 in a similar color to that of the light-guiding body 15 (a dark color). This structure enables the three-dimensional graduation 17 protruding from the through-hole 27 of the meter dial plate 13 to be illuminated when the ignition is ON. In this example, the light source 19 emits light in white and the white light enters the light-transmitting member 21 in a white kind of color. This structure enables the three-dimensional graduation 17 to look white when the ignition is ON. That is, the color of the three-dimensional graduation 17 visually recognized when the ignition is ON is determined depending on the color combination of the outgoing light from the light source 19 and the color of the light-transmitting member 21. Accordingly, an intended color of the three-dimensional graduation 17 when the ignition is ON is achieved by changing the above-described combination. As described above, in the speedometer 11, when the light source 19 emits outgoing light, the three-dimensional graduation 17 lights on in a light color different from that of the light-guiding body 15 in a dark color. The intended color may also be achieved, for example, by disposing a colored light-transmitting member (different from the light-transmitting member 21) made of a film in the intended color between the light-guiding body 15 and the light-transmitting member 21.

The following describes the effects of the structure of the scale graduation including the above-described structure.

In the structure of the scale graduation according to the present embodiment, the three-dimensional graduation 17 on the light-guiding body 15 made of the translucent material in a dark color looks black from the view direction due to the reflected light R1 from the graduation surface of the extraneous light E when the light source is OFF. By contrast, when the light source is ON, the light from the light source 19 enters the light-guiding body 15 through the light-transmitting member 21 and passes through the three-dimensional graduations 17. This structure enables the three-dimensional graduation 17 when the light source is ON to look in the color, as described above, corresponding to the combination of the outgoing light from the light source 19 and the color of the light-transmitting member 21.

The following describes the effects of the appearance of the three-dimensional graduation 17 when the ignition is OFF and when the ignition is ON. When the ignition is OFF, the color of the dial plate (a black kind of color) is similar to the color of the three-dimensional graduation (a black kind of color). This structure generates such an effect of contrast balance that the real image of the three-dimensional graduation 17 is difficult to see. When the ignition is ON, the three-dimensional graduation 17 is illuminated and looks white, for example, which generates an effect of (lighting) representation by itself. As a result, the structure of the scale graduation has a clear contrast between the appearance when the light source 19 is ON and the appearance when the light source 19 is OFF (the three-dimensional graduation 17 looks a white kind of color during ON, and a black kind of color during OFF), thereby achieving favorable effect of lighting representation.

With the structure of the scale graduation according to the present embodiment, when the ignition is ON, the light emitted from the light source 19, passing through the light-transmitting member 21, and entering the light-guiding body 15, is diffused by the grained surface 57. This operation prevents the unevenness of the intensity of the light emitted from the three-dimensional graduation 17 when the ignition is ON.

Owing to the presence of the grained surface 57, when the ignition is OFF, the extraneous light E entering the three-dimensional graduation 17 is reflected on the grained surface 57 as the reflected light R2 having the wavelength of a dark color. This operation prevents the three-dimensional graduation 17 from looking cloudy. In particular, when the light-transmitting member 21 in a white kind of color is disposed, the three-dimensional graduation 17 is likely to look cloudy without the grained surface 57 because the extraneous light E is reflected by the light-transmitting member 21. By contrast, with the structure according to the present embodiment, the grained surface 57 prevents the extraneous light E from entering the light-transmitting member 21, thereby preventing the three-dimensional graduations 17 from looking cloudy.

In addition, with the structure of the scale graduation according to the present embodiment, the color of the dial plate is similar to the color of the three-dimensional graduation, which generates such an effect of contrast balance that the real image of the three-dimensional graduation 17 is difficult to see. This structure effectively enhances the appearance when the ignition is ON.

As described above, the structure of the scale graduation and the vehicle instrument includes: the meter dial plate 13; the light-guiding body 15 made of the translucent material in a dark color and disposed on the back side of the meter dial plate 13; the three-dimensionally designed portion (the three-dimensional graduation 17) in the dark color protruding from the light-guiding body front surface of the light-guiding body 15 and disposed on the front side of the meter dial plate 13; and the light source 19 that makes light enter the three-dimensionally designed portion through the back side of the light-guiding body 15. In the structure of the scale graduation and the vehicle instrument, when the light source 19 emits outgoing light, the three-dimensionally designed portion lights on in a light color different from the dark color. With the structure of the scale graduation and the vehicle instrument according to the present embodiment, therefore, the appearance of the graduation when the ignition is ON and when the ignition is OFF is enhanced.

Figure 6:
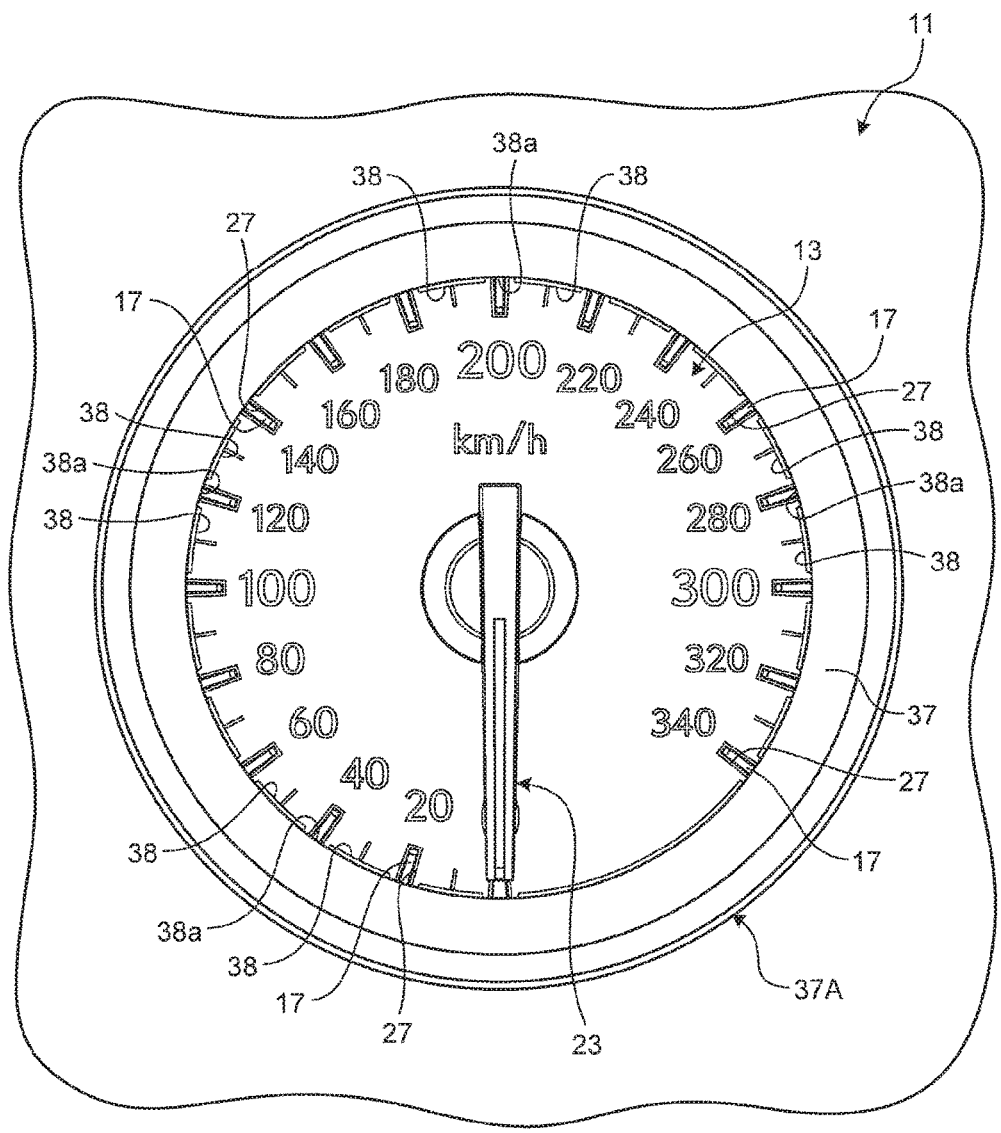
FIG. 6 is a front view of a specific example of the analog speedometer for a vehicle including the structure of the scale graduation according to the embodiment of the present invention.

The annular portion 37 (the facing 37) according to the present embodiment partially covers the three-dimensional graduation 17 from the vehicle room side. This structure provides a gap between the inner circumferential edge of the annular portion 37 (the facing 37) and the meter dial plate 13, between the three-dimensional graduations 17 adjacent to each other in the circumferential direction (the direction around the rotational central axis of the pointer 23). Considering this situation, between the three-dimensional graduations 17 adjacent to each other in the circumferential direction on the inner circumferential edge of the annular portion 37 (the facing 37), a protruding piece 38 is provided protruding to the front surface of the meter dial plate 13 (FIG. 6). The protruding piece 38 may be protruded in the axial line direction of the rotational central axis of the pointer 23. The protruding piece 38 may also be inclined relative to the axial line direction. If the inclined protruding piece 38 is visible, the appearance is preferably taken into account to determine the angle of inclination. Between the protruding pieces 38 adjacent to each other in the circumferential direction, a gap is provided as a groove 38a. The groove 38a is the place into which the three-dimensional graduation 17 is inserted. Accordingly, the protruding piece 38 is provided so as not to obstruct the work of inserting the three-dimensional graduation 17 into the groove 38a, by providing a gap between the end of the protruding piece 38 and the three-dimensional graduation 17 in the circumferential direction.

In addition, the three-dimensional graduation 17 according to the present embodiment includes, as described above, the inclined side 49 inclined to the light-guiding body front surface. The grained surface 57 on the light-guiding body back surface 55 exists on the area corresponding to the area from the long upright side 45 to the short upright side 51. This structure may cause the inclined side 49 to look in such a way that if it is closely viewed when the ignition is ON, the side of the long upright side 45 is darker than that of the short upright side 51. Therefore, with the structure of the scale graduation, the brightness difference between the side of the long upright side 45 and the side of the short upright side 51 in the inclined side 49 is preferably evened by providing the grained surface 57 on the light-guiding body back surface 55 to only the side of the short upright side 51. For example, the area where the grained surface 57 is provided on the side of the short upright side 51 is determined in such a range that the brightness difference between the side of the long upright side 45 and the side of the short upright side 51 in the inclined side 49 decreases.

The present invention is not limited to the above-described embodiment. The embodiment can be modified and improved appropriately. Moreover, the material, the shape, the size, the number, the position of arrangement, and the like of the components in the above-described embodiment can be determined as appropriate and not limited to those in the above-described embodiment, as long as they achieve the present invention.

With the structure of the scale graduation and the vehicle instrument according to the present invention, the appearance of the graduation when the ignition is ON and when the ignition is OFF is enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A structure of a scale graduation comprising:
   a meter dial plate;
   a light-guiding body made of a translucent material in a dark color;
   a three-dimensionally designed portion disposed in a protruding manner on a front surface of the light-guiding body, and made of the translucent material in the dark color disposed on the front side of the meter dial plate; and
   a light source that makes light enter the three-dimensionally designed portion through the light-guiding body, wherein
   when the light source emits outgoing light, the three-dimensionally designed portion lights on in a light color different from the dark color,
   a grained surface is provided on a place in the light-guiding body where light enters from the light source, and corresponding to the three-dimensionally designed portion, and
   the place in which the grained surface is provided is on a side of the light-guiding body that is away from the front surface of the light-guiding body.

2. The structure of the scale graduation according to claim 1, wherein
   the three-dimensionally designed portion is protruded from a through-hole provided by perforating to the meter dial plate, and is disposed on the front side of the meter dial plate.

3. The structure of the scale graduation according to claim 2, wherein
   a color print in a similar color to that of the light-guiding body is provided on the front surface of the meter dial plate.

4. A vehicle instrument comprising:
   the structure of the scale graduation according to claim 2; and
   a meter housing, wherein
   a plurality of the three-dimensionally designed portion in the structure of the scale graduation are disposed and serve as scale graduations of an instrument indicated by a pointer, and
   the meter housing houses therein the meter dial plate, the light-guiding body, the three-dimensionally designed portions, and the light source in the structure of the scale graduation, and exposes the meter dial plate and the three-dimensionally designed portion toward a vehicle room.

5. The vehicle instrument according to claim 4, further comprising:
   an annular portion, wherein
   the three-dimensionally designed portions are disposed along an outer circumferential edge of the meter dial plate,
   the annular portion covers the outer circumferential edge of the meter dial plate and partially covers the three-dimensionally designed portions from the vehicle room side, and
   the annular portion is provided as an annular facing integrally formed with the meter housing in a similar color to that of the light-guiding body, or as an annular member independently formed of the meter housing in a similar color to that of the light-guiding body.

6. The structure of the scale graduation according to claim 1, wherein
   a color print in a similar color to that of the light-guiding body is provided on the front surface of the meter dial plate.

7. A vehicle instrument comprising:
   the structure of the scale graduation according to claim 1; and
   a meter housing, wherein
   a plurality of the three-dimensionally designed portion in the structure of the scale graduation are disposed and serve as scale graduations of an instrument indicated by a pointer, and
   the meter housing houses therein the meter dial plate, the light-guiding body, the three-dimensionally designed portions, and the light source in the structure of the scale graduation, and exposes the meter dial plate and the three-dimensionally designed portion toward a vehicle room.

8. The vehicle instrument according to claim 7, further comprising:
an annular portion, wherein
the three-dimensionally designed portions are disposed along an outer circumferential edge of the meter dial plate,
the annular portion covers the outer circumferential edge of the meter dial plate and partially covers the three-dimensionally designed portions from the vehicle room side, and
the annular portion is provided as an annular facing integrally formed with the meter housing in a similar color to that of the light-guiding body, or as an annular member independently formed of the meter housing in a similar color to that of the light-guiding body.

9. The structure of the scale graduation according to claim 1, wherein
a color print in a similar color to that of the light-guiding body is provided on the front surface of the meter dial plate.

10. A vehicle instrument comprising:
the structure of the scale graduation according to claim 9; and
a meter housing, wherein
a plurality of the three-dimensionally designed portion in the structure of the scale graduation are disposed and serve as scale graduations of an instrument indicated by a pointer, and
the meter housing houses therein the meter dial plate, the light-guiding body, the three-dimensionally designed portions, and the light source in the structure of the scale graduation, and exposes the meter dial plate and the three-dimensionally designed portion toward a vehicle room.

11. The vehicle instrument according to claim 10, further comprising:
an annular portion, wherein
the three-dimensionally designed portions are disposed along an outer circumferential edge of the meter dial plate,
the annular portion covers the outer circumferential edge of the meter dial plate and partially covers the three-dimensionally designed portions from the vehicle room side, and
the annular portion is provided as an annular facing integrally formed with the meter housing in a similar color to that of the light-guiding body, or as an annular member independently formed of the meter housing in a similar color to that of the light-guiding body.

12. A vehicle instrument comprising:
the structure of the scale graduation according to claim 1; and
a meter housing, wherein
a plurality of the three-dimensionally designed portion in the structure of the scale graduation are disposed and serve as scale graduations of an instrument indicated by a pointer, and
the meter housing houses therein the meter dial plate, the light-guiding body, the three-dimensionally designed portions, and the light source in the structure of the scale graduation, and exposes the meter dial plate and the three-dimensionally designed portion toward a vehicle room.

13. The vehicle instrument according to claim 12, further comprising:
an annular portion, wherein
the three-dimensionally designed portions are disposed along an outer circumferential edge of the meter dial plate,
the annular portion covers the outer circumferential edge of the meter dial plate and partially covers the three-dimensionally designed portions from the vehicle room side, and
the annular portion is provided as an annular facing integrally formed with the meter housing in a similar color to that of the light-guiding body, or as an annular member independently formed of the meter housing in a similar color to that of the light-guiding body.

14. A structure of a scale graduation comprising:
a meter dial plate;
a light-guiding body made of a translucent material in a dark color;
a three-dimensionally designed portion disposed in a protruding manner on a front surface of the light-guiding body, and made of the translucent material in the dark color disposed on the front side of the meter dial plate; and
a light source that makes light enter the three-dimensionally designed portion through the light-guiding body, wherein
when the light source emits outgoing light, the three-dimensionally designed portion lights on in a light color different from the dark color,
a grained surface is provided on a place in the light-guiding body where light enters from the light source, and corresponding to the three-dimensionally designed portion, and
the grained surface is configured to diffuse the light from the light source such that the light is thereafter emitted from the three-dimensionally designed portion, and further configured to reflect light that enters the three-dimensionally designed portion such that the light reflected is emitted from the three-dimensionally designed portion.

* * * * *